(12) United States Patent
Drobe

(10) Patent No.: US 9,274,351 B2
(45) Date of Patent: Mar. 1, 2016

(54) METHOD FOR OPTIMIZING THE POSTURAL PRISM OF AN OPHTHALMIC LENS

(71) Applicant: Essilor International (Compagnie Generale d'Optique), Charenton-le-Pont (FR)

(72) Inventor: Björn Drobe, Singapore (SG)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/193,433

(22) Filed: Feb. 28, 2014

(65) Prior Publication Data

US 2014/0247424 A1  Sep. 4, 2014

(30) Foreign Application Priority Data

Mar. 1, 2013 (EP) .................................. 13305238

(51) Int. Cl.
*G02C 7/02* (2006.01)
*G02C 7/06* (2006.01)

(52) U.S. Cl.
CPC ............... *G02C 7/024* (2013.01); *G02C 7/027* (2013.01); *G02C 7/06* (2013.01); *G02C 7/061* (2013.01); *G02C 2202/06* (2013.01); *G02C 2202/24* (2013.01)

(58) Field of Classification Search
CPC .......... G02C 7/02; G02C 7/024; G02C 7/025; G02C 2202/24
USPC ............. 351/159.17, 159.45, 159.58, 159.59, 351/159.76, 159.77, 159.73, 159.74, 159.75
See application file for complete search history.

(56) References Cited

U.S. PATENT DOCUMENTS 6,343,861 B1  2/2002 Kris et al.
7,104,647 B2 *  9/2006 Krall .................. 351/159.06

(Continued)

FOREIGN PATENT DOCUMENTS

DE  102010021763 A1  12/2011
EP  1184710 A1  3/2002

(Continued)

OTHER PUBLICATIONS

Communication reporting the extended European Search Report and including the extended European Search Report dated Aug. 19, 2013 for European Patent Application No. EP13305238.1 (9 pages).

(Continued)

*Primary Examiner* — Darryl J Collins
(74) *Attorney, Agent, or Firm* — Cozen O'Connor

(57) ABSTRACT

Methods for optimizing postural prism to be added to a pair of ophthalmic multifocal lenses (lenses) adapted to a wearer and to slow down myopia progression are described. The method includes an initial pair of lenses in a providing step S1. In a postural prism adding step S2, a same postural prism is added to each lens. In a gazing step S3, the wearer gazes at a first distance target through the lenses with the added postural prism. A gazing direction determining step S4 determines the wearer's gazing direction during S3. Steps S2 to S4 may be repeated while changing the added postural prism, wherein the added postural prism is smaller than or equal to a maximum prism value. Steps S2 to S4 may be repeated to determine the smallest added postural prism for which the wearer's gazing direction in step S4 passes through the first vision zone.

20 Claims, 1 Drawing Sheet

(56) References Cited

U.S. PATENT DOCUMENTS

| | | | |
|---|---|---|---|
| 7,828,439 B2 * | 11/2010 | Krall | 351/246 |
| 7,862,171 B2 | 1/2011 | Varnas et al. | |
| 2011/0202286 A1 * | 8/2011 | De Rossi et al. | 702/19 |
| 2013/0135579 A1 | 5/2013 | Krug et al. | |

FOREIGN PATENT DOCUMENTS

| | | | |
|---|---|---|---|
| FR | 2850763 A1 | 8/2004 |
| FR | 2908898 A1 | 5/2008 |
| WO | WO-02088832 A2 | 11/2002 |

OTHER PUBLICATIONS

Machine translation of Abstract obtained from EPO/Google for DE102010021763, published 2015.

Machine translation of Abstract obtained from EPO/Google for FR2850763, published 2015.

Machine translation of Abstract obtained from EPO/Google for FR2908898, published 2015.

* cited by examiner

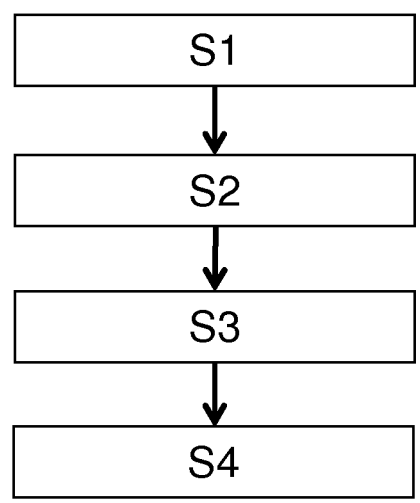

METHOD FOR OPTIMIZING THE POSTURAL PRISM OF AN OPHTHALMIC LENS

CROSS REFERENCE TO RELATED APPLICATION

This application claims priority from European Application for Patent No. 13305238 filed Mar. 1, 2013, the disclosure of which is incorporated by reference in its entirety.

FIELD OF THE INVENTION

The invention relates to a method for optimizing the postural prism to be added to a pair of ophthalmic lenses adapted to a wearer and to a method of providing a pair of ophthalmic lenses adapted to a wearer.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

It has been observed that some individuals, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

To slow down myopia progression which is due to this focusing defect, it is known to use a myopia-correcting lens which is of the progressive multifocal ophthalmic lens type. An example of such progressive multifocal ophthalmic lens is disclosed in U.S. Pat. No. 6,343,861.

Such a progressive multifocal ophthalmic lens comprises a far vision area, in which the optical power of the lens is adapted to correct the myopia of the wearer when observing far/distant objects, a near vision area, in which the myopia correction is reduced, and an intermediate area which is situated between the far vision and near vision areas, and in which the optical power of the lens varies continually. Such progressive multifocal ophthalmic lenses are adapted for the foveal vision of the weaver.

It has been observed that the efficiency of such progressive multifocal ophthalmic lenses, and more generally the efficiency of myopia control lenses, is highly variable from one wearer to another.

One reason of such high variance is the improper use by the wearer of such myopia control lenses.

Indeed, as most myopic wearers of those lenses are not presbyopic, they do not require any change in power to clearly see near objects and can therefore use any part of a progressive multifocal ophthalmic lens to read or write.

It has been observed that some wearers do not use the proper part of the myopia control lens, in particular when carrying out near vision tasks, thus reducing the beneficial effect of such myopia control lens.

Therefore, there is a need to provide a method that helps the user use properly the myopia control lenses so as to increase the efficiency of such lenses.

SUMMARY OF THE INVENTION

The embodiments described herein provide methods that meet one or more needs described above.

In one or more embodiments, there is provided one or more methods for optimizing the postural prism to be added to a pair of ophthalmic multifocal lenses adapted to a wearer and to slow down myopia progression. In the one or more methods, each ophthalmic multifocal lens comprises at least a first and a second distinct vision zone. The first vision zone may be adapted to a first distance vision. The postural prism may be optimized so as to have the wearer gaze through the first vision zone when gazing at a target at the first distance. The method may further comprise an initial pair of ophthalmic multifocal lenses providing step S1, during which a pair of ophthalmic multifocal lenses adapted to the wearer is provided to the wearer, each ophthalmic multifocal lens comprising at least two distinct vision zones, the first vision zone being adapted to a first distance vision. A postural prism adding step S2 may be included, during which a same postural prism is added to each ophthalmic multifocal lens. A gazing step S3 may be included, during which the wearer is required to gaze at at least a first distance target through the pair of ophthalmic multifocal lenses with the added postural prism. A gazing direction determining step S4 may be included, during which the wearer's gazing direction during the gazing step S3 is determined. In some embodiments, steps S2 to S4 are repeated while changing the added postural prism and imposing that the added postural prism is smaller than or equal to a maximum prism value. Steps S2 to S4 may be repeated so as to determine the smallest added postural prism for which the wearer's gazing direction determined during the gazing direction determining step S4 passes through the first vision zone. The first vision zone may be adapted to near vision and the first distance corresponds to near vision distance.

Adding a postural prism helps the wearer use most efficiently the pair of ophthalmic lenses. In particular adding postural prism makes the wearer gaze through the correct vision zone.

However, high value of postural prism can induce aberrations, such as transversal chromatic aberrations.

Advantageously, the method described herein provides the smallest postural prism that helps the wearer of the pair of ophthalmic lenses use efficiently the pair of ophthalmic lenses, i.e., has the wearer gazing direction pass through the first vision zone when gazing at a first distance object.

Therefore, the postural prism determined with any method described herein is the best compromise between the efficiency of the pair of ophthalmic lenses and the aberrations that may appear due to such postural prism.

According to further embodiments which can be considered alone or in combination are:
  during the gazing step S3, the wearer is requested to carry out vision tasks at the first distance for a duration of at least 30 seconds prior to the gazing direction determining step S4; and/or
  the maximum prism value PrMAX satisfies: $Pr_i$+ PrMAX≤10 prismatic diopters, with $Pr_i$ the initial prism of the lenses of the pair of ophthalmic lenses; and/or
  during the gazing direction determining step S4, the gazing direction of both eyes of the wearer is determined; and/or
  the first vision zone is associated with a first reference direction and wherein steps S2 to S4 are repeated so as to determine the smallest added postural prism to minimize the difference between the wearer's gazing direction determined during the gazing direction determining step S4 and the first reference direction; and/or the ophthalmic lenses are myopia control lenses; and/or the ophthalmic lenses are progressive multifocal ophthalmic lenses having optical power values that are variable along a meridian line between a far vision point and a near vision point; and/or steps S2 to S4 are repeated until the wearer's gazing direction determined during the gazing direction determining step S4 intersects the lenses at a point corresponding to at least 70% of the addition of the initial ophthalmic lenses; and/or the ophthalmic lenses are bifocal lenses comprising at least a near vision zone and a far vision zone; and/or steps S2 to S4 are repeated until the wearer's pupil fully appears in the near vision zone during the gazing step; and/or the postural prism is a base down prism; and/or the ophthalmic lenses comprise a central vision zone comprising the first vision zone and a peripheral vision zone and wherein the first vision zone is comprised in the central vision zone; and/or the initial pair of ophthalmic lenses provided during step S1 is provided with an active prism device adapted to provide a prism.

Embodiments described further include a method of providing a pair of ophthalmic lenses adapted to a wearer comprising the steps of any of the preceding claims and a postural prism providing step during which a postural prism corresponding to the prism determined when repeating steps S2 to S4 is provided to the initial ophthalmic lenses.

The provided postural prism may be a Fresnel prism.

The embodiments described may also include a pair of ophthalmic multifocal lenses adapted to slow down myopia progression comprising a postural prism, the postural prism being determined by a method described herein.

According to still further embodiments, described herein are computer program products, at least one or more of which comprise one or more stored sequences of instructions that are accessible to a processor and which, when executed by the processor, causes the processor to carry out the steps of one or more of the methods described herein.

What is described herein further includes a computer readable medium carrying one or more sequences of instructions of the computer program product described herein. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, part of what is described herein may be downloaded as a computer program or may be provided as output. The computer program may be transferred from a remote computer (e.g., a server, first computer) to a requesting computer (e.g., a client, second computer) by way of data signals embodied in a carrier wave or other propagation medium via a communication link (e.g., a modem or network connection).

Furthermore, what is described herein relate to a program which makes a computer execute one or more of the methods described. Any computer program product described herein may include a machine-readable medium having stored thereon instructions which may be used to program a computer (e.g., a processor or other electronic device) to perform a sequence of operations or may include a non-transitory computer-readable medium encoded with programmed instructions and execution of the programmed instructions causing another processor or computerized hosting service to run one or more of the described methods. Operations may also be performed by a combination of hardware and software.

Further embodiments described herein include a computer-readable storage medium having a program recorded thereon; where the program makes a computer execute one of the methods described herein. Such a computer program may be stored in the computer readable storage medium, or may be any type of media suitable for storing electronic instructions, and capable of being coupled to a computer system bus.

Embodiments described herein further include at least one device comprising a processor (general purpose of multi-purpose) adapted to store one or more sequence of instructions and to carry out at least one of the steps of any of the described methods. The methods described or steps of said methods may be embodied in machine-executable instructions which cause a general-purpose or special-purpose processor to perform certain steps. Said execution of the programmed instructions may cause an operably coupled device to respond, generate output, or otherwise operate. For example, a graphical interface or output may be generated. Various additional elements may also be included and associated with said at least one device, such as computer memory, hard drive, input devices and output devices.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments described herein may include apparatuses for performing the operations herein. Such apparatuses may be specially constructed for the desired purposes, or may comprise a general purpose computer or Digital Signal Processor ("DSP") selectively activated or reconfigured by a computer program stored in a computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments described herein are not described with reference to any particular programming language. It will be appreciated that a variety of programming languages may be used to implement the teachings as described herein.

DESCRIPTION OF THE DRAWING

Non limiting embodiments will now be described with reference to the accompanying drawing in which:

FIG. 1 is a flowchart of steps of a method described herein.

DETAILED DESCRIPTION OF THE EMBODIMENTS

One or more methods for optimizing the postural prism to be added to a pair of ophthalmic multifocal lenses adapted to a wearer and to slow down myopia are described herein.

As described herein, the postural prism is to be understood as a prism applied to both the right and left lenses. The postural prisms cover each entire lens and have the same orientation and value for both the right and left lenses. Such postural prisms are known to induce a change of posture of the wearer.

Each ophthalmic multifocal lens of the pair of ophthalmic multifocal lenses comprising at least a first vision zone adapted for a first distance vision and a second distinct vision zone.

According to methods described herein, the postural prism is optimized so as to have the wearer gaze through the first vision zone when gazing at a target at the first distance, the first vision zone being adapted to near vision and the first distance corresponding to near vision distance.

As illustrated on FIG. 1, the methods described herein comprise:
  an initial pair of ophthalmic multifocal lenses providing step S1,
  a postural prism adding step S2,
  a gazing step S3, and
  a gazing direction determining step S4.

A pair of ophthalmic multifocal lenses adapted to the wearer is provided during the initial pair of ophthalmic lenses providing step S1. Each ophthalmic multifocal lens of the pair of ophthalmic lenses comprises at least two distinct vision zones. The first vision zone is adapted for a first distance vision, the first vision zone is adapted for near vision zone and the second vision zone is adapted for far vision.

For example, the progressive multifocal ophthalmic lenses provided during the initial pair of ophthalmic multifocal lenses providing step S1 have an optical power that is variable along a meridian line between a far vision point and a near vision point.

The first distance vision zone corresponds to a near vision zone around the near vision point.

Progressive multifocal ophthalmic lenses commonly comprise a thinning prism, related to the difference of optical power between the far and near vision point. However, the inventors have observed that non-presbyopic wearers have a tendency to use either the far vision zone or an intermediate zone for near vision. Such misuse reduces the efficiency of progressive multifocal lenses to slow down myopia progression. Advantageously, the method described herein can be used to determine the postural prism to be added to thinning prism of the progressive multifocal lenses to help the wearer use the near vision zone when carrying out a near vision task.

The ophthalmic multifocal lenses provided during the initial pair of ophthalmic multifocal lenses providing step can comprise bifocal ophthalmic lenses. Usually bifocal ophthalmic lenses comprise at least a near vision zone adapted for near vision distance and a far vision zone adapted for far vision distance.

As for progressive multifocal lenses some wearers of bifocal lenses tend to use the far vision zone when carrying out near vision tasks, thus reducing the efficiency of bifocal lenses to slow down myopia progression. Adding a postural prism can help the wearer use as efficiently as possible both vision zones of the bifocal lenses.

Another example of ophthalmic multifocal lenses that may be provided during the initial pair of ophthalmic lenses providing step S1, is a pair of ophthalmic multifocal lenses comprising a central vision zone and a peripheral vision zone.

U.S. Pat. No. 7,862,171 B2 discloses an example of such lens to correct myopia. Such lens comprises a peripheral zone of more relative positive power, surrounding a far vision zone, and corrects the peripheral vision of the wearer. The lenses disclosed are not specifically progressive lenses.

During the postural prism adding step S2, a same postural prism, i.e. same orientation and amplitude, is added to each ophthalmic lens.

According to an embodiment described herein, together with the pair of ophthalmic multifocal lenses provided during step S1 an active prism device is provided. Such active prism device can be adapted to the initial pair of ophthalmic lenses so as to provide an additional postural prism. Such active prism device may be purely mechanical, adding different prism before the eyes of the wearer or may be obtained by using active optical device.

The postural prism may be provided by clip-ons or else be included in separate frames.

The first pair of ophthalmic multifocal lenses to be tested should preferably be the one that does not contain any postural prism, i.e. the postural prism provided during the postural prism adding step S2 is null, for example the pair of progressive multifocal lenses with only the thinning prism or bifocal ophthalmic multifocal lenses without postural prism.

However, in order to speed-up the overall time of the method, for example if the posture of the wearer is obviously not correct, the first lens to be tested could already contain a given amount of postural prism; for example half of the maximum prism value.

During the gazing step S3, the wearer is required to gaze at at least a first distance target through the pair of ophthalmic multifocal lenses with the added postural prism.

According to an embodiment, the wearer can be requested to carry out vision tasks at the first distance for a duration of at least 30 seconds, for example for a duration of about 1 to 5 minutes in order to provide time for the wearer to adapt to the pair of ophthalmic multifocal lenses and the added postural prism.

The tasks carried out during the gazing step S3 should be as natural as possible, in order to avoid any unnatural postural of the wearer.

Preferably, the tasks should require visual attention and should be active, for example clicking on a screen, keyboarding, writing, reading, etc. . . .

During the gazing direction determining step S4, the wearer's gazing direction is determined. Preferably the gazing directions of both eyes are determined.

Such gazing direction can be the average eye declination during the gazing step S3, the maximum eye declination during the gazing step S3, or the eye declination at a specific moment of the gazing step S3.

The gazing direction can be determined directly, for example by eye-tracking methods, or indirectly, for example deducted from the head tracking and knowledge of the position of the object the wearer is looking at. The Fastrack device provided by Polhemus may be used for such head tracking.

Preferably the measuring tool should be as non-invasive as possible.

The eye tracking could be done by using a camera that allows checking the location of the pupils of the wearer on the lenses. For example the RED system provided by SMI may be used for such eye tracking.

According to an embodiment, the camera may be included in the near vision tasks, such as a smartphone, PDA or touchpad. Appropriate software may then detect the pupils of the wearer and calculate the gazing direction with respect to the spectacle frame. For example, the camera may be mounted on the spectacle frame.

According to an embodiment, the first vision zone is associated with a first reference direction and steps S2 to S4 are repeated so as to determine the smallest added postural prism to minimize the difference between the wearer's gazing direction determined during the gazing direction determining step S4 and the first reference direction.

Steps S2 to S4 are repeated while changing the added postural prism and imposing that the added postural prism be smaller than or equal to a maximum prism value.

So as to limit the chromatic aberration and the impact on visual acuity, the maximum prism value PrMAX should satisfy $Pr_i + PrMAX \leq 10$ prismatic diopters, with $Pr_i$ the initial prism of the lenses of the pair of ophthalmic lenses.

Steps S2 to S4 are repeated so as to determine the smallest added postural prism for which the wearer's gazing direction determined during the gazing direction determining step S4 passes through the first vision zone.

When the ophthalmic lenses are progressive multifocal lenses, steps S2 to S4 may be repeated until the wearer's gazing direction determined during the gazing direction determining step S4 intersects the lenses at a point corresponding to at least about 70% of the addition of the initial ophthalmic lenses, for example at or about 85% of the addition of the initial ophthalmic multifocal lenses.

When the ophthalmic multifocal lenses are bifocal ophthalmic lenses, steps S2 to S4 may be repeated until the wearer's pupil fully appears in the near vision zone during the gazing step.

Other threshold values can be determined to stop repeating steps S2 to S4, for example a maximum declination angle can be provided.

According to a preferred embodiment described herein, the postural prism is a base down prism for both ophthalmic multifocal lenses, in particular in the cases of progressive multifocal lenses and bifocal lenses. Other orientation of the postural prism may be used, in particular in the case of ophthalmic multifocal lenses having a central vision zone and a peripheral vision zone.

Once the postural prism is optimized, what is described herein further relates to a method of providing a pair of ophthalmic multifocal lenses adapted to a wearer comprising further to the steps explained in detail previously, a postural prism providing step during which a postural prism corresponding to the optimized postural prism is provided to the initial ophthalmic lenses. The provided postural prism may be provided as a Fresnel prism.

What has been described above was described with the aid of embodiments without limitation of the general inventive concept.

Many further modifications and variations will suggest themselves to those skilled in the art upon making reference to the foregoing illustrative embodiments, which are given by way of example only and which are not intended to limit the scope described herein, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of what has been described herein.

The invention claimed is:

1. Method for optimizing a postural prism to be added to a pair of ophthalmic multifocal lenses adapted to a wearer and to slow down myopia progression, each multifocal ophthalmic lens comprising at least a first and a second vision zone, the first and second vision zones being distinct, the first vision zone being adapted to a first distance vision, the postural prism being optimized so as to have the wearer gaze through the first vision zone when gazing at a target at a first distance, the method comprising:
   an initial pair of ophthalmic multifocal lenses providing step S1, during which the pair of ophthalmic multifocal lenses adapted to the wearer is provided to the wearer, each ophthalmic multifocal lens comprising at least the first and the second vision zones, the first vision zone being adapted to the first distance;
   a postural prism adding step S2, during which a first postural prism is added to each ophthalmic multifocal lens;
   a gazing step S3, during which the wearer is required to gaze at at least the first distance target through the pair of ophthalmic multifocal lenses with the first postural prism of the postural prism adding step S2; and
   a gazing direction determining step S4, during which a wearer's gazing direction during the gazing step S3 is determined,
   steps S2 to S4 being repeated while changing the first postural prism and imposing that any added postural prism is smaller than or equal to a maximum prism value when steps S2 and S4 are repeated, steps S2 to S4 being repeated so as to determine a smallest added postural prism for which the wearer's gazing direction determined during the gazing direction determining step S4 passes through the first vision zone, and
   the first vision zone being adapted to a near vision and the first distance corresponding to a near vision distance.

2. The method according to claim 1, wherein during the gazing step S3, the wearer is requested to carry out vision tasks at the first distance for a duration of at least 30 seconds prior to the gazing direction determining step S4.

3. The method according to claim 1, wherein a maximum prism value PrMAX satisfies:
   $Pr_i + PrMAX \leq 10$ prismatic diopters, with $Pr_i$ being an initial prism of lenses of the initial pair of ophthalmic multifocal lenses.

4. The method according to claim 1, wherein the first vision zone is associated with a first reference direction and wherein steps S2 to S4 are repeated so as to determine the smallest added postural prism to minimize a difference between the wearer's gazing direction determined during the gazing direction determining step S4 and the first reference direction.

5. The method according to claim 1, wherein the ophthalmic multifocal lenses are myopia control lenses.

6. The method according to claim 1, wherein the ophthalmic multifocal lenses are progressive multifocal ophthalmic lenses having optical power values that are variable along a meridian line between a far vision point and a near vision point.

7. The method according to claim 6, wherein steps S2 to S4 are repeated until the wearer's gazing direction determined during the gazing direction determining step S4 intersects lenses of the pair of ophthalmic multifocal lenses at a point corresponding to at least 70% of addition of the initial pair of ophthalmic multifocal lenses.

8. The method according to claim 1, wherein the ophthalmic multifocal lenses are bifocal lenses comprising at least the near vision zone and a far vision zone.

9. The method according to claim 8, wherein steps S2 to S4 are repeated until the wearer's pupil fully appears in the near vision zone during the gazing step.

10. The method according to claim 1, wherein the postural prism is a base down prism.

11. The method according to claim 1, wherein the ophthalmic multifocal lenses comprise a central vision zone comprising the first vision zone and a peripheral vision zone, and wherein the first vision zone is comprised in the central vision zone.

12. The method according to claim 1, wherein the initial pair of ophthalmic multifocal lenses provided during step S1 is provided with an active prism device adapted to provide a prism.

13. A pair of ophthalmic multifocal lenses adapted to slow down myopia progression comprising a postural prism, the postural prism being provided by the method according to claim 1.

14. A pair of ophthalmic multifocal lenses adapted to slow down myopia progression comprising a postural prism, the postural prism being provided by the method according to claim 1, wherein the postural prism is a Fresnel prism.

15. A method of providing a pair of ophthalmic multifocal lenses adapted to a wearer comprising:
the method of claim 1 in which repeating steps S2 to S4 provides a selected postural prism to add to the initial pair of ophthalmic multifocal lenses; and
a postural prism providing step during which the selected postural prism corresponding to the selected postural prism determined when repeating steps S2 to S4 is provided to the initial pair of ophthalmic multifocal lenses.

16. The method according to claim 15, wherein the selected postural prism is a Fresnel prism.

17. The method according to claim 1, wherein the initial pair of ophthalmic multifocal lenses is a pair of ophthalmic multifocal lenses not containing any postural prism.

18. The method according to claim 1, wherein the initial pair of ophthalmic multifocal lenses is a pair of ophthalmic multifocal lenses already containing some amount of a prism.

19. The method according to claim 1, wherein the postural prism added to each multifocal lens is more than an initial amount of prism contained in the initial pair of ophthalmic multifocal lenses.

20. The method according to claim 1, wherein a plurality of vision tasks are carried out during the gazing step S3.

* * * * *